United States Patent [19]
Stendardo et al.

[11] Patent Number: 6,064,125
[45] Date of Patent: May 16, 2000

[54] UNINTERRUPTIBLE POWER SUPPLY UNIT

[75] Inventors: William J. Stendardo, Bogota, N.J.;
David W. Weisman, Stamford, Conn.

[73] Assignee: Mindvision Products, LLC, Upper Montclair, N.J.

[21] Appl. No.: 09/333,188

[22] Filed: Jun. 14, 1999

Related U.S. Application Data

[63] Continuation of application No. 09/003,454, Jan. 6, 1998, Pat. No. 5,912,514.

[51] Int. Cl.[7] ........................................ H02J 7/00
[52] U.S. Cl. .............................. 307/64; 307/66; 361/245; 320/165
[58] Field of Search ................................ 307/64, 66, 18, 307/23, 138, 150; 361/245; 340/693; 324/430, 524; 315/86; 320/165

[56] References Cited

U.S. PATENT DOCUMENTS

| | | | |
|---|---|---|---|
| 3,746,878 | 7/1973 | Viger | 340/693 |
| 4,130,731 | 12/1978 | Bolgiano et al. . | |
| 4,144,483 | 3/1979 | Thornley | 361/245 |
| 4,272,650 | 6/1981 | Bolgiano et al. . | |
| 4,495,596 | 1/1985 | Sciulli . | |
| 4,647,787 | 3/1987 | Pommer, II . | |
| 4,691,158 | 9/1987 | Hashimoto et al. | 324/430 |
| 4,749,908 | 6/1988 | Stifter | 315/86 |
| 4,754,262 | 6/1988 | Hackett et al. . | |
| 4,760,322 | 7/1988 | Crampton . | |
| 4,878,196 | 10/1989 | Rose . | |
| 4,893,248 | 1/1990 | Pitts et al. . | |
| 4,959,852 | 9/1990 | Kern et al. . | |
| 4,995,072 | 2/1991 | Pedigo . | |
| 5,003,581 | 3/1991 | Pittard . | |
| 5,119,412 | 6/1992 | Attallah . | |
| 5,122,795 | 6/1992 | Cubley et al. . | |
| 5,128,979 | 7/1992 | Reich et al. . | |
| 5,216,704 | 6/1993 | Williams et al. . | |
| 5,270,946 | 12/1993 | Shibasaki et al. . | |
| 5,287,013 | 2/1994 | Adair . | |
| 5,287,053 | 2/1994 | Hutchinson . | |
| 5,289,045 | 2/1994 | Lavin et al. | 307/64 |
| 5,317,545 | 5/1994 | Gray et al. . | |
| 5,332,927 | 7/1994 | Paul et al. . | |
| 5,530,296 | 6/1996 | Masaki . | |
| 5,555,289 | 9/1996 | Hashimoto | 307/150 |
| 5,578,875 | 11/1996 | Dormer et al. . | |
| 5,579,197 | 11/1996 | Mengelt et al. . | |
| 5,585,677 | 12/1996 | Cheon et al. . | |
| 5,612,580 | 3/1997 | Janonis et al. . | |
| 5,623,531 | 4/1997 | Nilssen . | |
| 5,625,237 | 4/1997 | Saeki et al. | 307/48 |
| 5,646,462 | 7/1997 | Cortes et al. | 324/524 |
| 5,912,514 | 6/1999 | Stendardo et al. | 307/64 |
| 5,925,942 | 7/1999 | Theobald | 307/125 |

*Primary Examiner*—Jeffrey Gaffin
*Assistant Examiner*—Peter Zura
*Attorney, Agent, or Firm*—Cowan, Liebowitz & Latman, P.C.; Michael I. Wolfson

[57] ABSTRACT

An uninterruptible power supply unit for coupling between an adapter with an adapter connector and an electronic device in accordance with one embodiment of the present invention includes a self-contained housing, a backup power supply, and an output switch system. The self-contained housing has an input port for coupling with the adapter connector from the adapter and an output connector extending from the housing for coupling with the electronic device. The backup power supply is located in the housing and provides the backup power. The output switch system is also located in the housing. The output switch system is coupled between the output connector and the input port and the backup power supply and couples the backup power from the backup power supply to the electronic device when incoming power from the adapter fails. The uninterruptible power supply unit may also include a polarity switch moveable between a positive position coupling one lead of the output connector to the positive terminal for the backup power supply and a negative position coupling the one lead of the output connector to the negative terminal for the backup power supply.

15 Claims, 3 Drawing Sheets

UNINTERRUPTIBLE POWER SUPPLY UNIT

CROSS-REFERENCE TO RELATED APPLICATIONS

Continuation Application

The following patent application is a Continuation Application based on and claims the benefit of U.S. patent application Ser. No. 09/003,454, filed Jan. 6, 1998, now U.S. Pat. No. 5,912,514.

FIELD OF THE INVENTION

The present invention relates generally to an uninterruptible power supply unit and, more particularly, to an uninterruptible power supply unit in a self-contained housing for coupling between an adapter and an electronic device with a polarity sensing system and a polarity switch.

BACKGROUND OF THE INVENTION

A large number of electronic devices, such as cordless telephones, computers, baby monitors, radios, and answering machines, which are found in the home and office do not possess a backup power supply. As a result, when power service is interrupted, these electronic devices are inoperable. For example, without power, cordless phones will not work, so in an emergency an individual can not make a call. To date, there is no cost effective means for consumers to provide an external backup power supply for their existing electronic devices that are powered by AC adapters.

Even if such an external backup power supply system existed, there is no means for consumers of average technical competence to correctly set the polarity for a backup power supply to match the incoming power. If the polarity of the backup power from a backup power supply is incorrectly set, the electronic device may be damaged.

Some prior electronic devices have tried to solve these problems by incorporating internal backup power supplies. In these electronic devices, the backup power supplies provide backup power when there is a power outage and the manufacturers of these devices make sure that the polarity of the backup power supplies matches the polarity of the incoming power. Although these internal backup power supplies work, these features add to the overall cost of the electronic devices. Even though backup power supplies are desirable for many electronic devices, some consumers do not want to pay for this additional feature for every electronic device they purchase.

SUMMARY OF THE INVENTION

An uninterruptible power supply unit for coupling between an adapter with an adapter connector and an electronic device in accordance with one embodiment of the present invention includes a self-contained housing, a backup power supply, and an output switch system. The self-contained housing has an input port for coupling with the adapter connector from the adapter and an output connector extending from the housing for coupling with the electronic device. The backup power supply is located in the housing and provides the backup power. The output switch system is also located in the housing. The output switch system is coupled between the output connector on one hand and the input port and the backup power supply on the other hand and couples the backup power from the backup power supply to the electronic device when incoming power from the adapter fails.

An uninterruptible power supply unit in accordance with another embodiment of the present invention includes a backup power supply and a polarity switch. The unit may also include a polarity sensing system with at least one polarity indicator. The backup power supply has a positive terminal and a negative terminal. The polarity switch is moveable between a positive position coupling one lead of the output connector to the positive terminal for the backup power supply and a negative position coupling the one lead of the output connector to the negative terminal for the backup power supply. The polarity sensing system senses the polarity of the incoming power and the polarity indicator signals the sensed polarity.

The uninterruptible power supply unit provides a number of advantages including providing a self-contained uninterruptible power supply unit which can be used with a variety of different electronic products between the adapter and the electronic device. As a result, consumers can provide backup power to essential electronic devices in their homes and offices without having to suffer the expense of purchasing new electronic devices with built-in backup power systems to replace electronic devices they already own that do not have backup power supplies. Additionally, consumers do not have to bear the additional cost of an internal backup power supply for every electronic device they purchase. Instead, the consumer can simply purchase an uninterruptible power supply unit for each electronic device the consumer wants to backup. For example, providing backup power to one of three cordless telephones in a consumer's home may be sufficient for emergencies.

Additionally, the uninterruptible power supply unit provides a system so that the polarity of the backup power can easily be set to match the polarity of the incoming device. As discussed above, if the polarity of the backup power supply is incorrectly set, then the electronic device might be damaged. With electronic devices with internal backup power supplies, the manufacturers have already made sure that the polarity of the backup power source matches the incoming power. However, with an external backup power supply, it is up to the user to correctly set polarity. With the present invention, the user is signalled with the correct polarity and can easily set the uninterruptible power supply unit to the correct polarity.

Further, the uninterruptible power supply unit can also be used as an emergency power supply for an electronic device. In some remote locations, an AC power source, such as a standard wall outlet, may not be available. In these situations, when the uninterruptible power supply unit is plugged into the electronic device, the backup power automatically is turned on to power the electronic device.

Even further, the uninterruptible power supply unit can be modified to provide power from a backup power supply which oscillates at a set frequency. For some applications, such as telephone answering machines, the input power needs to oscillate at a frequency of about 60 Hz.

DETAILED DESCRIPTION

Figure 1:
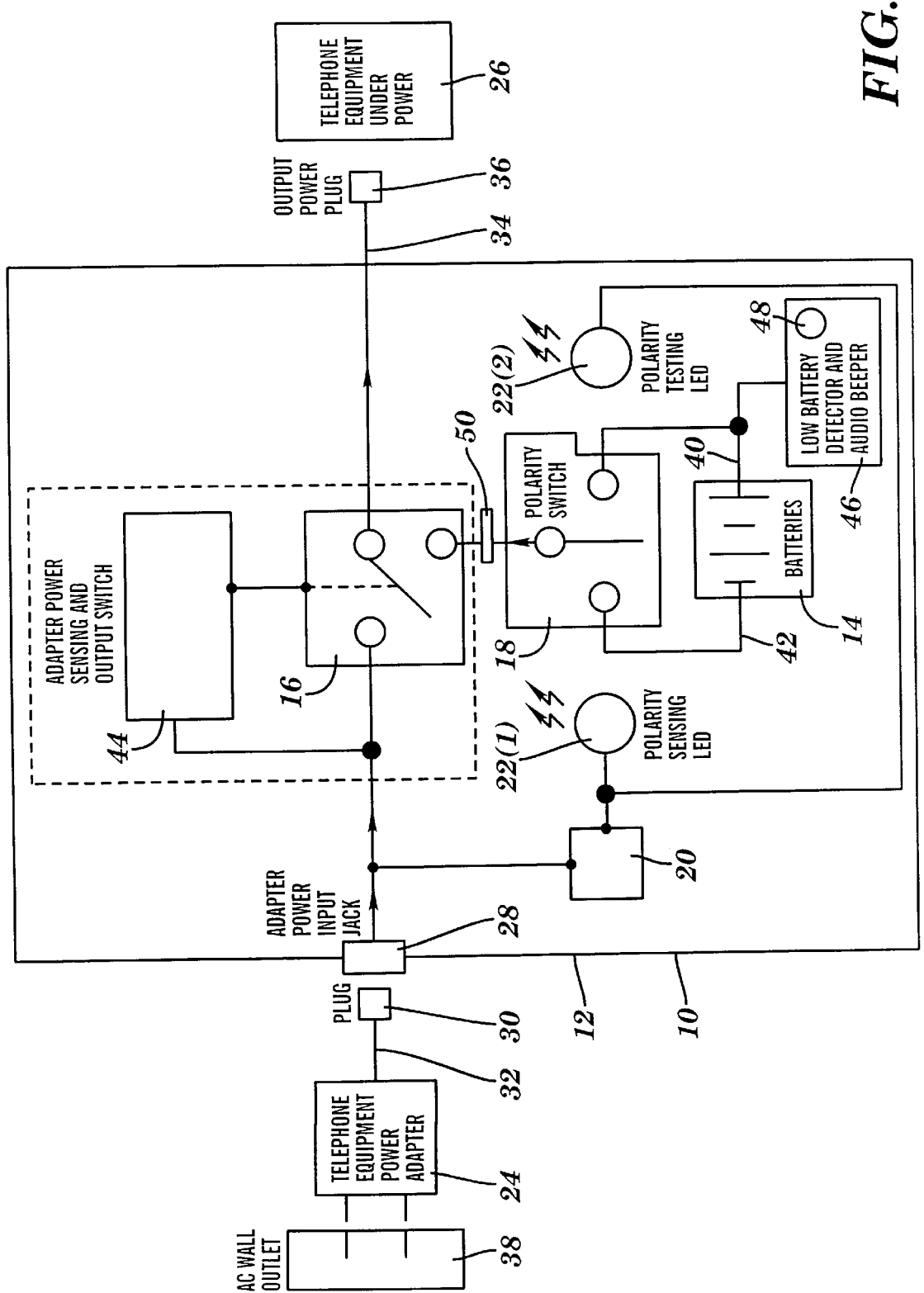
FIG. 1 is a block diagram of an uninterruptible power supply unit in accordance with one embodiment of the present invention.

An uninterruptible power supply unit 10 in accordance with one embodiment of the present invention is illustrated in FIG. 1. The uninterruptible power supply unit 10 in accordance with one embodiment of the invention includes a self-contained housing 12, a backup power supply 14, and an output switch system 16. The uninterruptible power supply unit 10 in accordance with another embodiment of the present invention includes backup power supply 14 and a polarity switch 18 and may include a polarity sensing system 20 and polarity indicators 22(1) and 22(2). The uninterruptible power supply unit 10 provides a number of advantages including providing a self-contained uninterruptible power supply unit 10 which can be used with a variety of different electronic products between an adapter 24 and the electronic device 26 and provides a mechanism so that the polarity of the backup power can easily be set to match the polarity of the incoming power.

Referring more specifically to FIG. 1, the uninterruptible power supply unit 10 includes the self-contained housing 12. The housing 12 has an input port or jack 28 for coupling with a plug 30 at the end of an adapter connector 32 from the adapter 24. The housing 10 also has an output connector 34 extending from the housing 12 with a plug 36 at one end for coupling with the electronic device 26. In this particular embodiment, the output connector 34 comprises a pair of leads. In this particular embodiment, the input port 28 has a barrel-shaped opening which is designed to receive the plug 30 which has a cylindrical shape at the end of the adapter connector 32, although the shape of the opening in the input port 28 and of the plug 30 at the end of the adapter connector 32 can vary as needed or desired as long as input port 28 and the plug 30 can mate together. One of the advantages of this invention is that the uninterruptible power supply unit 10 is located in this self-contained housing 12 external to the electronic device 26 and can be used with a variety of different types of electronic devices 26 to provide backup power.

The adapter 24 is coupled to a power source 38, which in this particular embodiment is an AC power source, such as a standard wall outlet which outputs about 110 volts AC. The adapter 24 converts this voltage to about nine to twelve volts DC and about 500 milliamperes and outputs it to the adapter connector 32. Although in this particular embodiment, the adapter 24 is providing DC power converted from AC power, the adapter 24 can provide either AC or DC voltage at any desired voltage and current output levels.

The electronic device 26 includes a device port (not shown) to receive the plug 36 at the end of the output connector 34. Again, the plug 36 at the end of the output connector 34 and the device port can have any shape desired or needed as long as they mate. The electronic device 26 can be any type of device, such as a cordless telephone, baby monitor, radio, answering machine, or computer.

The backup power supply 14 is located in the self-contained housing 12 and has a positive terminal 40 and a negative terminal 42. In this particular embodiment, the backup power supply 14 includes eight batteries which provide between about six to twenty hours of backup power depending on the current draw of the electronic device 26. Although batteries are used as the backup power supply 14 in this particular embodiment, any type of power source can be used as the backup power supply 14 needed and desired.

An output level sensing system 44 is also located in the housing 12 and is coupled to the input port 28 and to the output switch system 16. The output level sensing system 44 senses when incoming power is being received from the adapter 24 and when incoming power fails. By way of example, the failure of the incoming power can be determined by monitoring the incoming power to see when it falls below a threshold level. In this particular embodiment, the threshold level is about nine volts DC, although the threshold level can vary as needed or desired. When the output level sensing system senses that incoming power is being received, then the output level sensing system 44 sends a first signal to the output switch system 16 to couple the incoming power to the output connector 34. When the output level sensing system 44 senses that the incoming power fails, e.g. falls below a threshold level, the output level sensing system 44 sends a second signal to the output switch system 16 to couple the backup power from the backup power supply 14 to the output connector 34.

Figure 2:
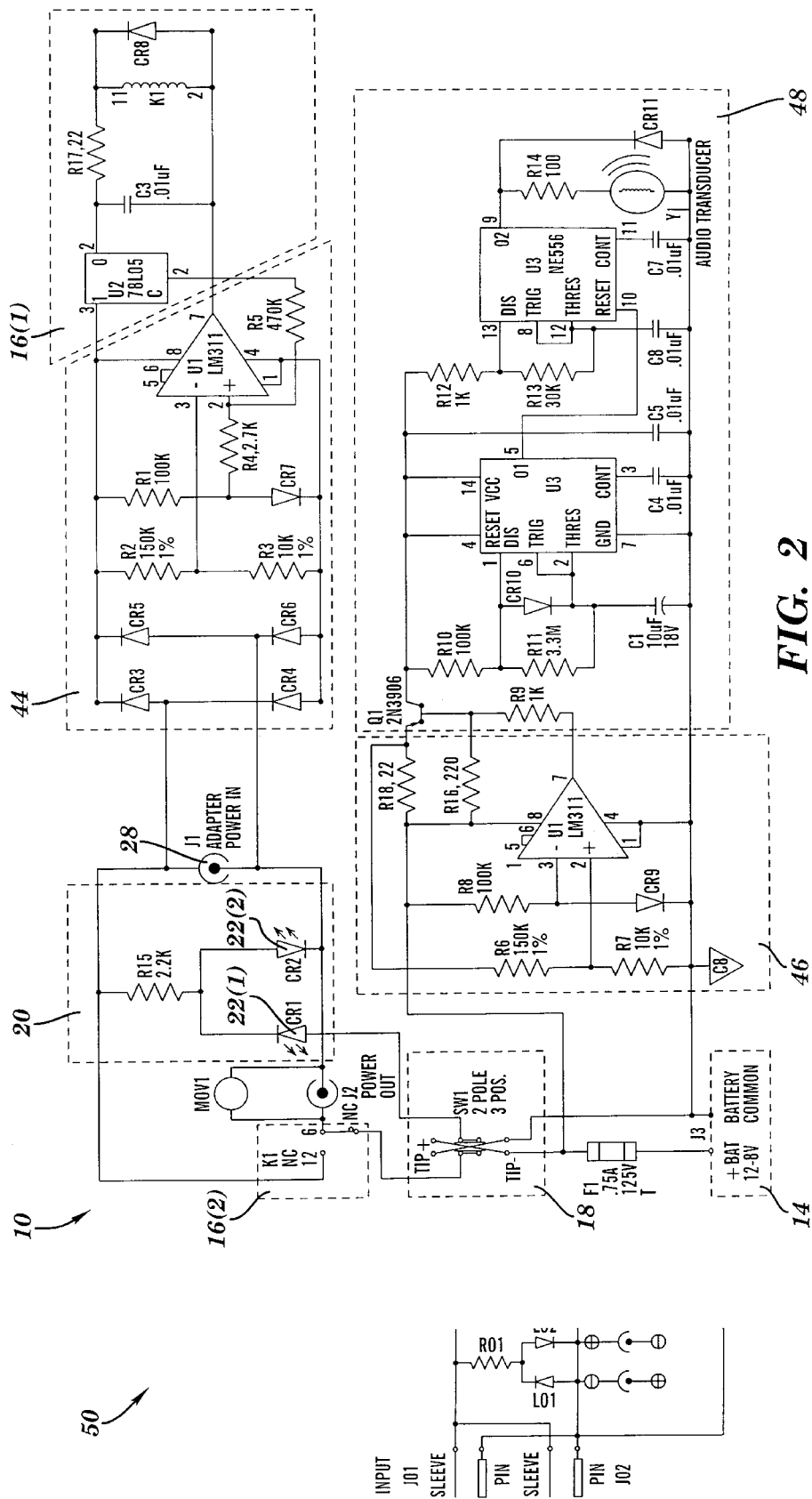
FIG. 2 is a circuit diagram of the uninterruptible power supply unit in accordance with one embodiment of the present invention.

Referring to FIG. 2, one embodiment of a circuit diagram of the uninterruptible power supply unit 10 with the output level sensing system 44 is illustrated. Output level sensing system 44 comprises diodes CR3, CR4, CR5, CR6, and CR7, voltage comparator U1, and resistors R1, R2, R3, R4, and R5. Diodes CR3, CR4, CR5, and CR6 are used to rectify the voltage from the adapter 24 so that the output level sensing system 44 will work with an adapter 24 of either polarity. The voltage comparator U1 generates a signal at pin 7 that is low (for example zero volts) when the voltage from adapter 24 is above a predetermined threshold and generates a signal at pin 7 that is high (for example five volts) when the voltage from the adapter is below the predetermined threshold. More specifically, the voltage comparator U1 generates an output at pin 7 that is low or high depending on whether the voltage at pin 3 is higher or lower than the voltage at pin 2. The voltage at pin 2 is a reference voltage that is related essentially to the constant voltage drop across diode CR7. The voltage at pin 3 is related to the voltage drop across resistor R3, which is dependent on the values of resistors R2 and R3, which comprise a voltage divider circuit, and the input voltage from adapter 24. The values of resistors R2 and R3 are selected to establish the desired voltage threshold for the adapter 24 which determines whether pin 7 of U1 is high or low. When the voltage comparator U1 generates an output at pin 7 that is low, e.g. zero volts, the output level sensing system 44 signals output switch system 16 to couple the incoming power from the adapter 24 to the electronic device 26. When the voltage comparator U1 generates an output at pin 7 that is high, e.g. five volts, output level sensing system 44 signals output switch system 16 to couple the backup power from the backup power supply 14 to the electronic device 26.

Referring back to FIG. 1, the output switch system 16 is also located in the housing 12 and is coupled between the output connector 34 on one hand and the input port 28 and the backup power supply 14 on the other hand. The output switch system 16 couples the incoming power from the adapter 24 to the electronic device 26 when incoming power is being received from the adapter 24. The output switch system 16 couples the backup power from the backup power supply 14 to the output connector 34 when the incoming power fails. In this particular embodiment, the output switch system 16 is operated in response to the first and second signals received from the output level sensing system 44, although other means for controlling output switch system 16 could be used, such as a manual switch operated by the user of the uninterruptible power supply unit 10.

Referring to FIG. 2, one embodiment of a circuit diagram of the output switch system 16(1) and 16(2) is illustrated. The output switch system 16(1) and 16(2) includes voltage regulator U2, switching relay K1, resistor R17, capacitor C3, and diode CR8. The output switch system 16(1) and 16(2) uses relay K1 to selectively supply power to the output connector 34 from either the adapter 24 or the backup power supply 14. When the voltage from adapter 24 is above the threshold voltage, pin 7 of voltage comparator U1 is low, e.g. zero volts, and relay K1 is energized by virtue of one end of the relay coil being electrically connected to pin 7 of U1, and therefore at zero volts, the other end of the relay coil being electrically connected through resistor R17 to five volts, which is the voltage of pin 1 of voltage regulator U2. With relay K1 energized, pin 6 of K1 is connected to pin 12 of K1 (although this connection is not shown in FIG. 2), so the output connector 34 receives power from the adapter 24. When the voltage from adapter 24 is below the threshold voltage, pin 7 of voltage comparator U1 is high, e.g. five volts, so pin 2 of voltage regulator U2 is also high, which shuts down voltage regulator U2 and de-energizes relay K1. In the de-energized state, pin 6 of relay K1 is electrically connected to pin 1 of relay K1, so the output connector 34 receives power from the backup power supply 14.

Referring back to FIG. 1, the polarity sensing system 20 is also located in the housing 12 and includes a pair of polarity indicators 22(1) and 22(2) which are located in openings (not shown) in the housing 12 and are visible from the outside of the housing 12. The polarity sensing system 20 senses the polarity of the incoming power and the polarity indicators 22(1) and 22(2) indicate whether the polarity is positive or negative. One polarity indicator 22(2) is used to signal that the polarity is positive and the other polarity indicator 22(1) is used to signal that the polarity is negative. In this particular embodiment, the polarity indicators 22(1) and 22(2) are light emitting diodes CR1 and CR2 in the embodiment in FIG. 2, although other types of indicators 22, such as a buzzer could be used as needed or desired. Additionally, although in this particular embodiment two polarity indicators 22(1) and 22(2) are used, the polarity sensing system 20 can use other numbers of indicators 22, such as one. If only one polarity indicator 22 was used, when the polarity indicator 22 were lit it could signify that the polarity was positive and if unlit could signify that the polarity was negative, or vice versa. One of the advantages of the present invention is that it enables the user of the uninterruptible power supply unit 10 to easily set the polarity of the backup power to match the incoming power so that the electronic device 26 coupled to the uninterruptible power supply unit 10 is not damaged.

The polarity switch 18 is coupled at one end to the one lead of the output connector 34 and is moveable between a positive position coupling the positive terminal 40 of the backup power supply 14 to the one lead of the output connector 34 or to a negative position coupling the negative terminal 42 of the backup power supply 14 to the one lead of the output connector 34. Initially, the polarity switch 18 is kept in a neutral position so that when the uninterruptible power supply unit 10 is initially installed, the electronic device 26 will not be damaged by an incorrect polarity setting. The polarity switch 18 may be moved in response to a signal from one of the polarity indicators 22(1) or 22(2), such as one of the diodes CR1 or CR2 being lit or from a review of the adapter 24 to determine the correct polarity for the incoming power.

Referring to FIG. 2, one embodiment of a circuit diagram of the polarity sensing system 20, polarity indicators 22(1) and 22(2) and the polarity switch 18 are illustrated. In this particular embodiment, the polarity sensing indicators 22(1) and 22(2) are semiconductor rectifiers CR1 and CR2 which emit visible light when current flows through them. The rectifiers CR1 and CR2 are connected in parallel with each other, and the pairs are then connected in series with current limiting resistor R15. The combined circuit is then connected across input jack J1 which is input port 28 in FIG. 1. When the polarity of the direct current (DC) voltage from adapter 24 is "tip positive", current will flow through CR1 and it will emit light, indicating to the operator that polarity switch SW1 should be moved toward CR1, which establishes a "tip positive" voltage from the backup power supply 14 when adapter 24 drops below a preset threshold. Similarly, when the polarity of the direct current voltage from adapter 24 is "tip negative", current will flow through CR2 and it will emit light, indicating to the operator that polarity switch SW1 should be moved toward CR2 in order to establish a "tip negative" voltage from the backup power supply 14 when adapter 24 drops below the preset threshold.

Referring back to FIG. 1, a low backup power supply sensing system 46 is also located in the housing 12 and includes a low power indicating system 48. The low backup power supply sensing system 46 senses or measures the amount of backup power in the backup power supply 14 left and signals via the low power indicating system 48 when backup power is below a preset level. In this particular embodiment, the preset level occurs when less than about 21% of the backup power remains and the low power indicating system 48 uses a buzzer which begins to make noise periodically when backup power dips below the preset level, although other types of indicators, such as a light emitting diode, could be used as needed or desired to signal low backup power.

Referring to FIG. 2, one embodiment of a circuit diagram of the low backup power supply sensing system 46 is illustrated. The low backup power supply sensing system 46 includes a voltage comparator U4, resistors R6, R7, R8, R16, and R18, and diode CR9. Pin 7 of voltage comparator U4 is high, e.g. five volts, when the backup power supply voltage is higher than a predetermined threshold and is low, e.g. zero volts, when the backup power supply voltage is below the predetermined threshold. Voltage comparator U4 generates an output at pin 7 that is low or high, e.g. zero volts or five volts, based on whether the voltage at pin 3 is higher or lower than the voltage at pin 2. The voltage at pin 3 is a reference voltage equal to the essentially constant voltage drop across diode CR9. The voltage at pin 2 is equal to the voltage drop across resistor R7, which is dependent on the values of voltage dividing resistors R7 and R6, the voltage drop across fuse F1 and backup power supply voltage. The values of R6 and R7 are selected to establish the desired backup power supply voltage threshold which determines whether pin 7 or U4 high or low. When pin 7 of voltage comparator U4 is high, e.g. five volts, low backup power supply sensing system 46 signals low backup power supply indicating system 48 to signal, e.g. by a buzzing noise or a warning light, that backup power is low. When pin 7 of voltage comparator U4 is low, e.g. zero volts, low backup power supply sensing system 46 signals low backup power supply indicating system 48 does not generate any type of signal.

The low backup power supply indicating system 48 includes audio transducer Y1, transistor Q1, dual timer U3, resistors R9, R10, R11, R12, R13, and R14, capacitors C1, C4, C5, C6, C7, and diode CR10. Audio transducer Y1 is intermittently energized to alert the consumer when a low battery condition exists. When the voltage from backup power supply 14 drops below its predetermined threshold, then pin 7 of voltage comparator U4 drops to a low, e.g. zero volts, transistor Q1 turns on, which in turn energizes the two timer circuits that include dual timer U3. The timer circuits in turn control the energization of audio transducer Y1. The first timer circuit, which has an output O1 determines the coarse on/off timing of audio transducer Y1. For example, Y1 may be energized for 1 second out of every 20 second interval. The second timer circuit, which has an output O2 determines the frequency at which audio transducer Y1 will be energized during each "on" period established by the first timer circuit. For example, the second timer circuit might oscillate Y1 at 2.5 kHz, which is a typical frequency within the human hearing system.

Figure 3:
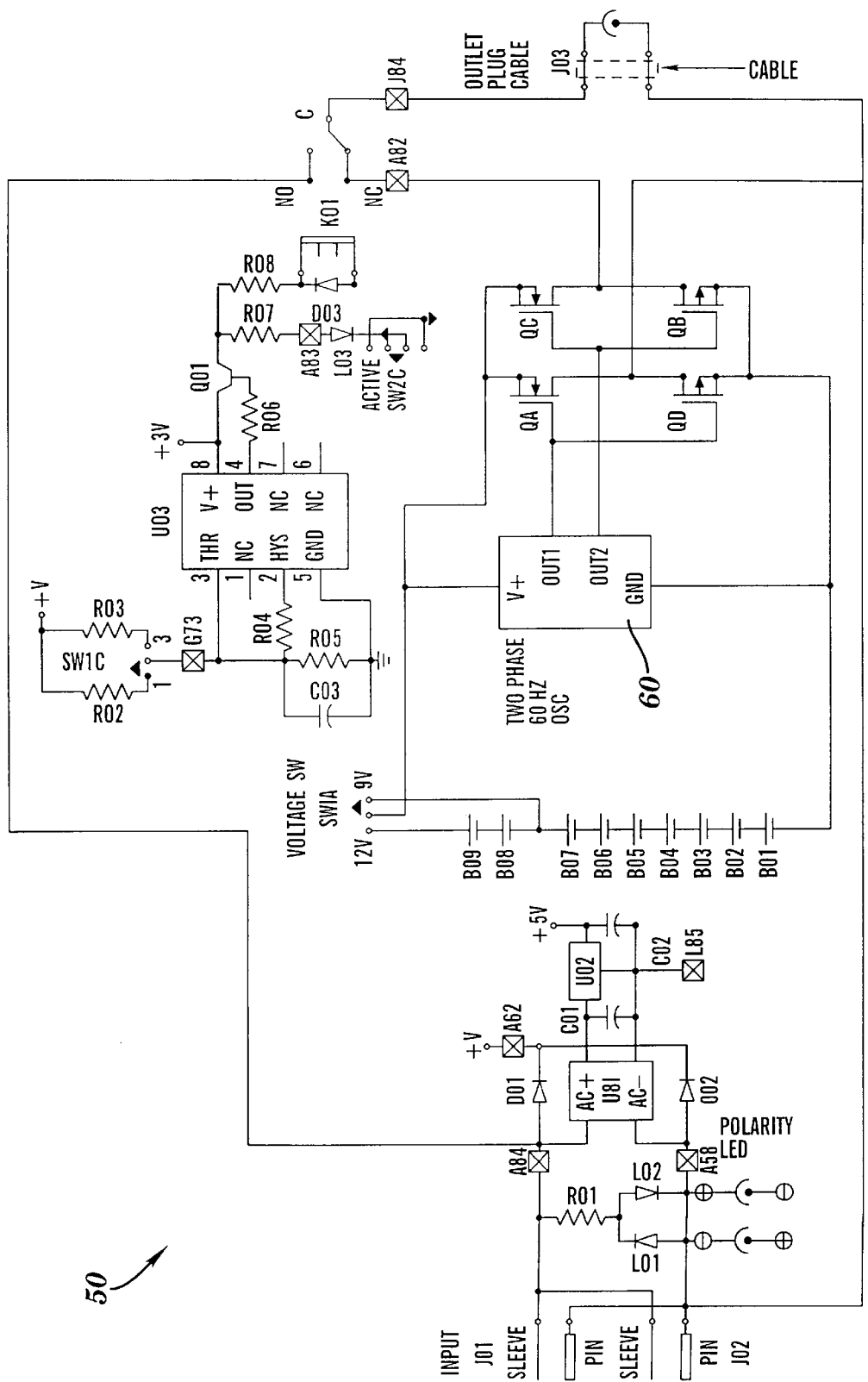
FIG. 3 is a circuit diagram of one embodiment of an oscillating system for the uninterruptible power supply unit.

Referring to FIGS. 1 and 3, an optional oscillating system 50 for the uninterruptible power supply unit 10 is illustrated. The oscillating system 50 is located in the housing 12 and is coupled between the polarity switch 18 and the output connector 34. The oscillating system 50 oscillates the backup power on the output connector 34. In this particular embodiment the output power is oscillated at a frequency of about 60 Hz, although the oscillating frequency can vary as needed or desired.

As shown in FIG. 3, one embodiment of an oscillating system 50 is illustrated, the oscillating system or circuit 50 includes a two phase 60 Hz oscillator circuit 60 and field effect transistors QA, QB, QC, and QD. The two phase 60 Hz oscillator circuit 60 drives a bridge circuit formed by power MOSFETs QA, QB, QC, and QD. Only two of the MOSFETs QA, QB, QC, and QD are conducting at any one time causing the voltage at the output J03, which is coupled to output switch system 16, to alternate in polarity at a 60 Hz rate. Although MOSFETs are shown, other components, such as bipolar transistors may be used. The two phase 60 Hz oscillator circuit 60 may be something as simple as a 555 timer circuit driving an invertor or a 32.768 kHz crystal oscillator with a divider circuit.

Referring to FIGS. 1 and 2, the uninterruptible power supply unit 10 provides a reliable source of backup power. When incoming power is received by the uninterruptible power supply unit 10, the polarity sensing system 20 senses the polarity of the incoming power and signals either the positive or negative polarity indicator 22(1) and 22(2) to light. Initially, the polarity switch 18 is set in neutral, and the user of the uninterruptible power supply unit 10 should move the polarity switch 18 to either the positive or negative polarity position. Alternatively, the polarity of the incoming power from the adapter 24 can be determined from markings on the adapter 24 or from other information and the polarity switch 18 can be set to the correct positive or negative polarity without the need for the polarity sensing system 20 and the polarity indicators 22(1) and 22(2). In the positive polarity position one lead of the output connector 34 is coupled to a positive terminal 40 for the backup power supply 14 and in the negative polarity position the one lead of the output connector 34 is coupled to a negative terminal 42 for the backup power supply 14.

Next, the output level sensing system 44 senses whether incoming power is being received. In this particular embodiment, the output level sensing system 44 senses the voltage of the incoming power to see if it is above a threshold level, such as about nine volts DC, although the output level sensing system 44 could sense or monitor other parameters, such as current, and the threshold level could be set at a different level. If the output level sensing system 44 senses incoming power, then the output level sensing system 44 signals the output switch system 16 to couple the incoming power from the adapter 24 to the output connector 34. If the output level sensing system 44 senses that the incoming power has failed, e.g. that the incoming power has fallen below a threshold level, then the output level sensing system 44 signals the output switch system 16 to couple the backup power from the backup power supply 14 to the output connector 34.

A low backup power supply indicator system 44 coupled to the backup power supply 44 monitors the amount of backup power remaining. If the backup power falls below a preset level, such as 21% in this particular embodiment, then the low backup power supply indicator system 44 sends a signal to the low power indicator 48 which signals a low power condition, such as a repeated buzzing noise or a flashing light.

For certain applications, such as some telephone answering machines, an oscillating power signal is needed. In these applications, the uninterruptible power supply unit 10 includes an oscillating system 50 between the polarity switch 18 and the output connector 34. The oscillating system 50 oscillates the backup power to a first frequency, such as about 60 Hz in this particular example.

The uninterruptible power supply unit 10 is also easy to install. First, a backup power supply 14, such as one or more batteries, are installed in the uninterruptible power supply unit 10. Next, the adapter 24 for the electronic device 26 is unplugged from the main power source 38, such as a standard 110 volt AC wall outlet, if plugged in. The adapter connector 32 is then plugged into the input port 28 and the adapter 24 is plugged back into the main power source 38.

Next, either the positive or negative polarity indicator 22(1) and 22(2) should be lit. The polarity switch 18 is initially set in a neutral position and should be moved towards the lit polarity indicator 22(1) and 22(2) which indicates whether or not the polarity is positive or negative. Alternatively, the polarity of the adapter 24 can be determined from markings on the adapter 24 or other information and the polarity switch 18 can be set to the correct polarity without the need for the polarity sensing system 20 or the polarity indicators 22(1) and 22(2).

Once the polarity of the uninterruptible power supply unit 10 is correctly set, then the output connector 34 from the uninterruptible power supply unit 10 is plugged into the electronic device 26. When incoming power fails, the uninterruptible power supply unit 10 supplies backup power to the electronic device 26. The uninterruptible power supply unit 10 can also be used as the power source for the electronic device 26 where there is no main power source by simply connecting the unit 10 to the electronic device 26.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A power supply system comprising:

an input means for receiving a direct current from a primary power supply;

an output means for supplying said direct current to an electrical unit;

a backup power supply for storing power, said backup power supply receiving said direct current from said primary power supply when power is being supplied by said primary power supply;

a first switch for connecting said primary power supply to said output means when power is being supplied by said primary power supply, and for connecting said backup power supply to said output means when power is not being supplied by said primary power supply; and a second switch for connecting and disconnecting a positive terminal of said backup power supply to a positive lead of said output means and a negative terminal of said backup power supply to a negative lead of said output means.

2. The power supply system of claim 1, wherein, said primary power supply comprises a current conversion means, said current conversion means receives an alternating current and transforms said alternating current in to said direct current.

3. The uninterruptible power supply unit as set forth in claim 1 further comprising an output level sensing system in the housing, the output level sensing system signalling the output switch system to switch to the backup power when the incoming power fails.

4. The uninterruptible power supply unit as set forth in claim 3 wherein the output level sensing system senses a voltage level of the incoming power.

5. The uninterruptible power supply unit as set forth in claim 1 further comprising a polarity sensing system with at least one polarity indicator, the polarity sensing system sensing the polarity of the incoming power and the polarity indicator signaling the sensed polarity.

6. The uninterruptible power supply unit as set forth in claim 5 wherein the polarity indicator is a light emitting diode.

7. The uninterruptible power supply unit as set forth in claim 1 further comprising a low backup power supply indicator system coupled to the backup power supply, the low backup power supply indicator system including a low power indicator which signals when low power is sensed by the low backup power supply indicator system.

8. The uninterruptible power supply unit as set forth in claim 7 wherein low power indicates that less than about 21% of the backup power remains.

9. The uninterruptible power supply unit as set forth in claim 1 further comprising an oscillator system located in the housing and coupled between the backup power supply and the output connector, the oscillator system oscillating the backup power on the output connector at a first frequency.

10. The uninterruptible power supply unit as set forth in claim 9 wherein the first frequency is about 60 Hz.

11. A power supply system comprising:

an input means for receiving an alternating current from a primary power supply;

an output means for supplying a direct current to an electrical unit;

a current conversion means for transforming said alternating current into said direct current;

at least one backup power supply for storing power, said of said at least one backup power supply receiving said direct current from said current conversion means when power is being supplied by said primary power supply;

a first switch for connecting said current conversion means and said at least one backup power supply to said output means; and a second switch for connecting and disconnecting a positive terminal of said at least one backup power supply to a positive lead of said output means and a negative terminal of said at least one backup power supply to a negative lead of said output means.

12. An uninterruptible power supply unit for providing power to an electronic device having a primary power supply for receiving power from an AC power source and supplying a DC power to power said electronic device, the uninterruptible power supply unit comprising:

a backup power supply for supplying backup power to power said electronic device;

a first switch for coupling and de-coupling said primary power supply and said backup power supply to said electronic device; and a second switch for coupling and de-coupling a positive lead of said electronic device to a positive terminal of said backup power supply and a negative lead of said electronic device to a negative terminal of said backup power supply.

13. The uninterruptible power supply unit of claim 12, wherein said first switch couples said primary power supply to said electronic device when power is received from said AC power source and couples said backup power supply to said electronic device when power is not received from said AC power.

14. The uninterruptible power supply unit of claim 13, wherein said backup power supply is at least one rechargeable battery.

15. The uninterruptible power supply unit of claim 14, further comprising a housing including at least said backup power supply and said first and second switches.

* * * * *